US012319074B2

United States Patent
Slocumb et al.

(10) Patent No.: US 12,319,074 B2
(45) Date of Patent: Jun. 3, 2025

(54) IDENTIFYING OBJECT SHAPE, ROTATION, AND POSITION FOR PRINTING AND QUALITY CONTROL

(71) Applicant: Optomatic LLC, St. Petersburg, FL (US)

(72) Inventors: Joshua Jacques Slocumb, Fort Lauderdale, FL (US); Justin Paul Stark, Stafford, TX (US)

(73) Assignee: Optomatic LLC, St. Petersburg, FL (US)

( * ) Notice: Subject to any disclaimer, the term of this patent is extended or adjusted under 35 U.S.C. 154(b) by 255 days.

(21) Appl. No.: 18/051,806

(22) Filed: Nov. 1, 2022

(65) Prior Publication Data

US 2023/0084769 A1 Mar. 16, 2023

(51) Int. Cl.

| | | |
|---|---|---|
| *B41J 3/407* | (2006.01) | |
| *B41J 11/00* | (2006.01) | |
| *G06T 7/00* | (2017.01) | |
| *G06T 7/149* | (2017.01) | |
| *G06T 7/33* | (2017.01) | |
| *G06T 7/564* | (2017.01) | |

(52) U.S. Cl.
CPC ............ *B41J 3/407* (2013.01); *B41J 11/007* (2013.01); *B41J 11/0095* (2013.01); *G06T 7/0006* (2013.01); *G06T 7/149* (2017.01); *G06T 7/344* (2017.01); *G06T 7/564* (2017.01); *G06T 2207/30144* (2013.01)

(58) Field of Classification Search
CPC ...... B41J 2/17553; B41J 29/393; B41J 3/407; B41J 11/007; B41J 11/0095; B41J 11/003; B41J 11/008; B41J 2203/01; G06T 7/0006; G06T 7/149; G06T 7/344; G06T 7/564; G06T 2207/30144; G06T 5/80

See application file for complete search history.

(56) References Cited

U.S. PATENT DOCUMENTS

| | | | |
|---|---|---|---|
| 2006/0119628 A1* | 6/2006 | Kofman | ............... B41J 3/407 347/2 |
| 2016/0107468 A1* | 4/2016 | Leynadier | ............. B41J 11/008 347/16 |

OTHER PUBLICATIONS

Engineered Printing Solutions (EPS) Direct-to-Object Digital Decoration: Practical Considerations PDF, 8 pages Accessed: Nov. 14, 2024.
Engineered Printing Solutions (EPS) Brochure: Let Us Help You Change The Way You Print PDF, 10 pages Accessed: Nov. 14, 2024.
Engineered Printing Solutions (EPS) Product Catalog (Rev. 4—Nov. 2012) PDF, 74 pages Accessed: Nov. 14, 2024.
Engineered Printing Solutions (EPS) Specifications Brochure: Single-Pass Inkjet Printer PDF, 2 pages Accessed: Nov. 14, 2024.

\* cited by examiner

*Primary Examiner* — Jannelle M Lebron

(57) ABSTRACT

A method for printing on an item, that includes generating a scanned shape of the item, performing a lookup of the scanned shape in a shape database, making a determination that the scanned shape matches a saved shape in the shape database, and based on the determination, measuring an item rotation of the item, generating a transformed print image based on the item rotation, causing a printhead to print on the item using the transformed print image.

20 Claims, 8 Drawing Sheets

IDENTIFYING OBJECT SHAPE, ROTATION, AND POSITION FOR PRINTING AND QUALITY CONTROL

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

DETAILED DESCRIPTION

General Notes

Figure 1A:
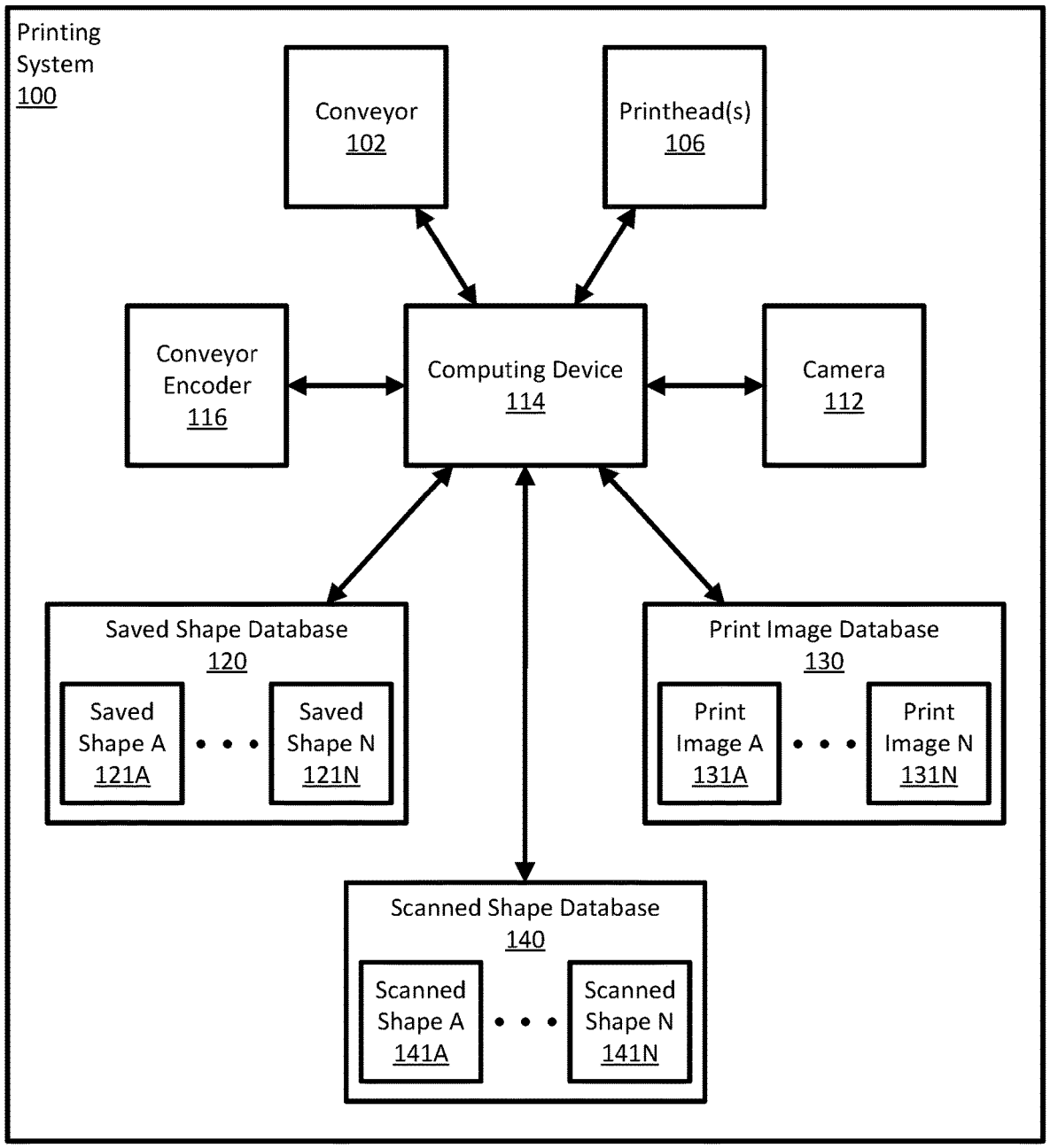
FIG. 1A shows a diagram of a printing system, in accordance with one or more embodiments.

As it is impracticable to disclose every conceivable embodiment of the invention, the figures, examples, and description provided herein disclose only a limited number of potential embodiments. One of ordinary skill in the art would appreciate that any number of potential variations or modifications may be made to the explicitly disclosed embodiments, and that such alternative embodiments remain within the scope of the broader invention. Accordingly, the scope should be limited only by the attached claims. Further, certain technical details, known to those of ordinary skill in the art, may be omitted for brevity and to avoid cluttering the description of the novel aspects.

For further brevity, descriptions of similarly-named components may be omitted if a description of that similarly-named component exists elsewhere in the application. Accordingly, any component described with regard to a specific figure may be equivalent to one or more similarly-named components shown or described in any other figure, and each component incorporates the description of every similarly-named component provided in the application (unless explicitly noted otherwise). A description of any component is to be interpreted as an optional embodiment—which may be implemented in addition to, in conjunction with, or in place of an embodiment of a similarly-named component described for any other figure.

Lexicographical Notes

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the word "data" is used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

As used herein, the term "operative connection" (or "operatively connected") means the direct or indirect connection between devices that allows for interaction in some way (e.g., via the exchange of information). For example, the phrase 'operatively connected' may refer to a direct connection (e.g., a direct wired or wireless connection between devices) or an indirect connection (e.g., multiple wired and/or wireless connections between any number of other devices connecting the operatively connected devices).

Generally, as used herein, the noun "position" means the lateral and/or longitudinal displacement (e.g., offset) of any object from a known origin (e.g., any point, edge, surface, etc.)—without respect to the rotation of the object. As a non-limiting example, an object may be positioned laterally one inch rightward and two inches downward. Thus, an object's "lateral position" may be one inch from a left edge, and an object's "longitudinal position" may be two inches from a top edge. Similarly, as used herein, the verb "position" means the translation (e.g., movement), laterally and/or longitudinally, of any object with respect to a known origin.

As used herein, the verb "rotate", noun "rotation", and adjective "rotated" take their ordinary meanings.

As used herein, the verb "transform", noun "transformation", and adjective "transformed" means (i) position, (ii) rotation, or (iii) a combination of position and rotation. As a non-limiting example, a "transformed object" may be an object that has been rotated, but not positioned. As another non-limiting example, a "transformed image" (e.g., a digital image) may be an image that is laterally positioned, but not rotated. And, as another non-limiting example, a "transformed item" may be rotated, laterally positioned, and longitudinally positioned.

Overview and Advantages

In general, this application discloses one or more embodiments of systems and methods for detecting object shape, rotation, and position for printing and other quality control purposes.

Specialized printing systems—with limited configurability—require precise control of an item's rotation and position in order to accurately print on that item (i.e., apply ink to the item). Such control is accomplished by attempting to force the item into a certain rotation and position (e.g., via feeders, guides, placing robots, etc.), where the item's movement may be tracked or measured (e.g., via a leading edge). Then, if the item is successfully rotated, positioned, and accurately tracked—the item aligns with one or more printhead(s) that print a desired image onto the item, at the proper location and angle.

Failure to properly rotate and position an item may cause the printhead(s) to (i) place ink that partially (or entirely) misses the item, and/or (ii) place ink on the item at an incorrect angle (e.g., 30° off, 180° off ("upside down")). In such instances, ink is wasted and an (otherwise properly manufactured) item may be scrapped. Further, even when an item is successfully aligned and ink is correctly applied, an item may be defective (e.g., damaged, improperly manufactured, etc.) thereby wasting ink on an item that will ultimately be scrapped, regardless of the correctly applied ink.

Moreover, in automated, industrial, and mass-production environments—properly rotating and positioning items may require specialized and custom-made printing systems. Such printing systems may be expensive to manufacture, expensive to maintain, and have limited functionality beyond their initial design. Consequently, manufacturing costs are inflated, and product innovation may be stifled (e.g., minor design improvements to an item may be prohibitively expensive to implement if the printing system needs to be modified to accept the new item design).

Accordingly, in one or more embodiments herein, a more versatile printing system is described that allows for (i) printing on items that are placed at any rotation (i.e., not needing to be rotated), (ii) printing on items that are placed at any lateral position (i.e., not needing to be guided into an exact position), (iii) printing on items with different shapes (separately or concurrently), and (iv) not printing on defective (or otherwise unrecognized) items.

To accomplish this, a more versatile printing system may be equipped with a computing device and a camera that generates a scanned shape of an item (e.g., via image data) that is used to identify a known shape (e.g., a saved shape in a saved shape database) that matches the scanned shape. Further, the camera measures the item's rotation (compared to the known shape) and the item's lateral position (e.g., a distance from a side edge of the conveyor). Using the known shape and the item's rotation, the computing device identifies and rotates a print image (associated with the known shape) to match the item's measured rotation. The computing device then sends the modified print image to one or more printhead(s) and laterally shifts the printhead(s) to align with the item's lateral position. The printhead(s) are then controlled to print the modified print image on the rotated item (e.g., as the item passes beneath the printhead(s) on the conveyor).

As such a printing system is more general purpose—not needing specially-designed rotation and positioning equipment (e.g., feeders, guides, placing robots, etc.)—an end user may configure the printing system (e.g., via software) to accept multiple, new, different, or modified item designs (reducing initial and future manufacturing costs). Further, such versatile printing systems may be manufactured in advance of customer orders, thereby reducing the duration from when a customer orders the printing system to final delivery (e.g., "lead time"). And, as the printing system may be configured to identify and avoid printing on defective items, material waste may be reduced, and enhanced quality control may be implemented. Lastly, such a versatile printing system may be more accurate (than conventional systems) via the use of optical and/or laser position measurements used to identify an item's rotation and position.

FIGS. 1A-1C

Figure 1B:
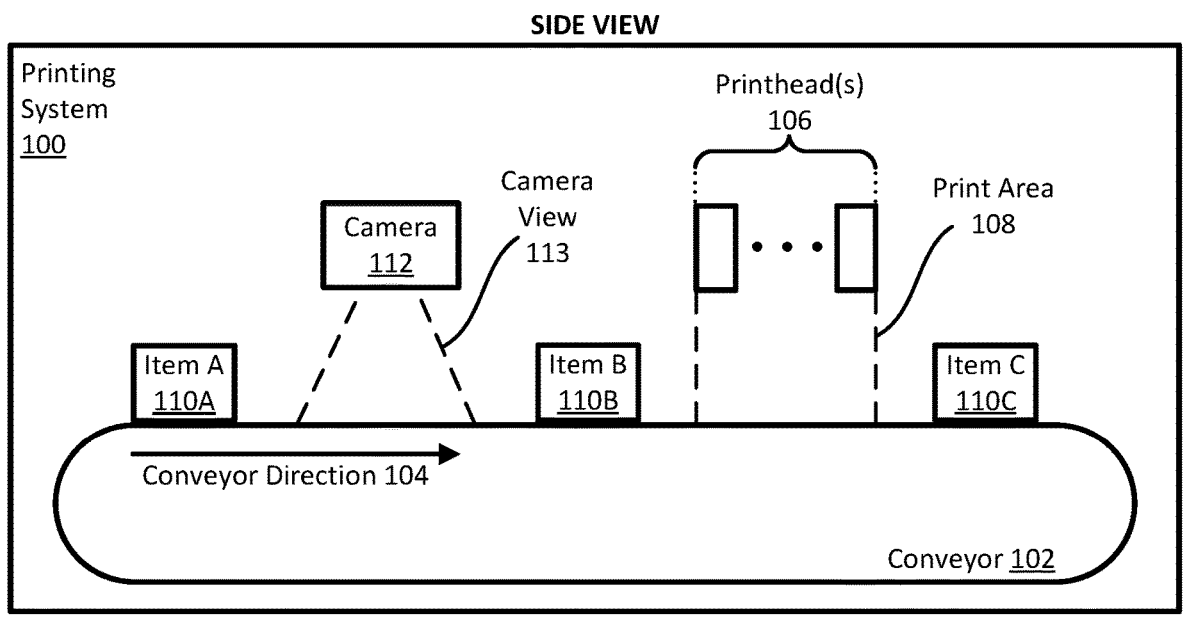
FIG. 1B shows a diagram of a side view of a printing system, in accordance with one or more embodiments.
Figure 1C:
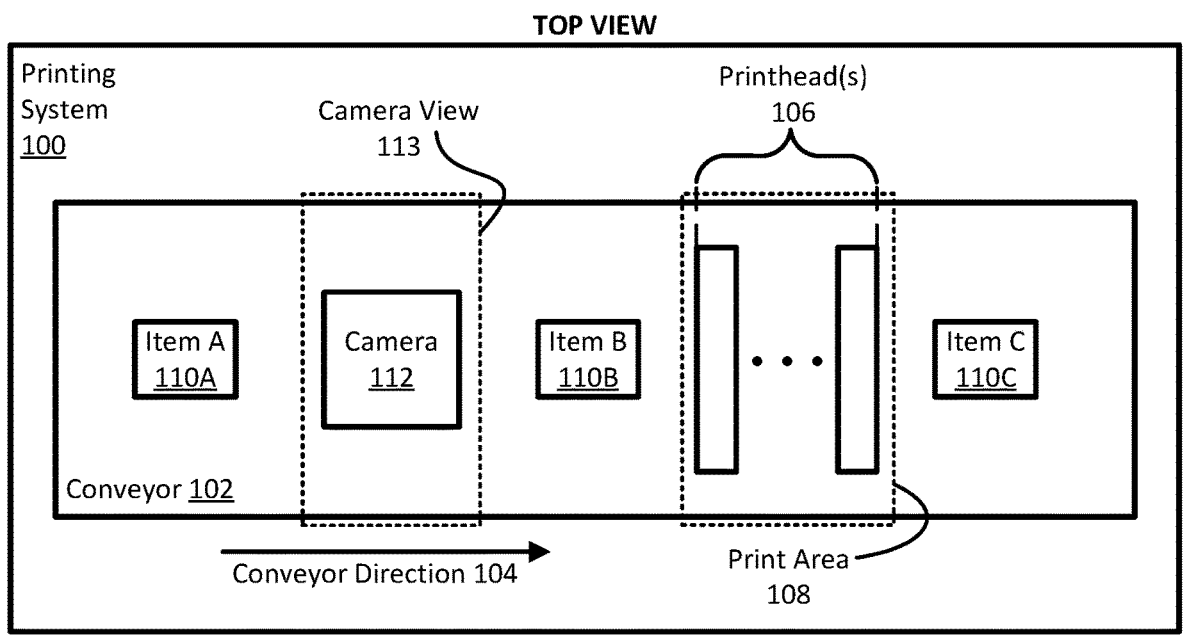
FIG. 1C shows a diagram of a top view of a printing system, in accordance with one or more embodiments.

FIGS. 1A, 1B, and 1C show a diagram of a printing system and the various subcomponents thereof, in accordance with one or more embodiments.

In one or more embodiments, a printing system (e.g., printing system (100)) is an electromechanical system that allows for one or more item(s) (110) to be loaded, moved, and printed on by one or more printhead(s) (106). A printing system (100) may include a computing device (114) operatively connected to a conveyor (102), a conveyor encoder (116), one or more printhead(s) (106), and a camera (112). Further, the computing device may access (read from) and/or modify (write to) one or more databases (i.e., a saved shape database (120), a print image database (130), and a scanned shape database (140)).

In one or more embodiments, a computing device (e.g., computing device (114)) is hardware that includes any one, or combination, of the following components:

(i) processor(s), (ii) memory (volatile and/or non-volatile), (iii) persistent storage device(s), (iv) internal physical interface(s) (e.g., serial advanced technology attachment (SATA) ports, peripheral component interconnect (PCI) ports, PCI express (PCIe) ports, next generation form factor (NGFF) ports, M.2 ports, etc.), (v) external physical interface(s) (e.g., universal serial bus (USB) ports, recommended standard (RS) serial ports, audio/visual ports, etc.), (vi) communication interface(s) (e.g., network ports, small form-factor pluggable (SFP) ports, wireless network devices, etc.), (vii) input and output device(s) (e.g., mouse, keyboard, monitor, other human interface devices, compact disc (CD) drive, other non-transitory computer readable medium (CRM) drives).

Further, in one or more embodiments, the persistent storage (and/or memory) of the computing device (114) may store computer instructions (e.g., computer code) which, when executed by the processor(s) of the computing device (114) (e.g., as software), cause the computing device (114) to perform one or more processes specified in the computer instructions. Non-limiting examples of a computing device (114) include a general purpose computer (e.g., a personal computer, desktop, laptop, tablet, smart phone, etc.), a network device (e.g., switch, router, multi-layer switch, etc.), a server (e.g., a blade-server in a blade-server chassis, a rack server in a rack, etc.), a controller (e.g., a programmable logic controller (PLC)), and/or any other type of computing device (114) with the aforementioned capabilities.

In one or more embodiments, a saved shape database (e.g., saved shape database (120)) is a data structure that may include (i) one or more saved shape(s) (121) for items (110) that are actively being printed on, (ii) one or more saved shape(s) (121) for items (not shown) not present on the conveyor (102), or (iii) any combination thereof.

In one or more embodiments, a saved shape (e.g., saved shape A (121A), saved shape N (121N)) is a data structure that may include (or otherwise be associated with):
(i) data that provides the partial and/or complete two-dimensional contours of an item (110) (e.g., an image file and/or a CAD file),
(ii) a unique saved shape identifier that allows for the unique identification of the single saved shape (e.g., a tag, an alphanumeric entry, a filename, a row number in table, etc.),
(iii) a print image (131) associated with the saved shape (e.g., the print image database (130) may be included in or combined with the saved shape database (120)),
(iv) a unique print image identifier associated with a print image (131) in the print image database (130) (e.g., a tag, an alphanumeric entry, a filename, a row number in table, etc.),
(v) a first similarity threshold specifying a percent similar value, above which a scanned shape (141) is considered a "match",
(vi) a second similarity threshold specifying a percent similar value, above which a scanned shape (141) is considered "defective" (if also below the first similarity threshold),
(vii) an action to perform if a scanned shape (141) has a percent similar value above the first similarity threshold (e.g., print on the item),
(viii) an action to perform if a scanned shape (141) has a percent similar value above the second similarity threshold, but below the first similarity threshold (e.g., send an alert, do nothing, etc.),
(ix) an action to perform if a scanned shape (141) has a percent similar value below the first similarity threshold and the second similarity threshold (e.g., send an alert, do nothing, etc.),
(x) any other property relevant to a saved shape (121), or
(xi) any combination thereof.

In one or more embodiments, data that provides the partial and/or complete two-dimensional contours of an item (110) may be an image file in any format (e.g., any compressed or uncompressed image file format, a tag image file format (TIFF) file, a portable network graphics (PNG) file, a JPEG/JPG file, etc.) using pixels in contrasting colors (e.g., a black pixel outline on a white pixel background) or using only a single color (e.g., any color pixel outline on a transparent background).

In one or more embodiments, data that provides the partial and/or complete two-dimensional contours of an item (110) may be a CAD file in any format (e.g., standard triangle/tessellation language (STL), STEP, etc.) using vector-defined lines and/or mathematical equations to generate the contours of the saved shape (121).

In one or more embodiments, one or more similarity threshold(s) (e.g., a first similarity threshold, a second similarity threshold) may be specified (e.g., by a user, by default) for all saved shapes (121) in the saved shape database (120) (e.g., individually, in groups, and/or as a whole). Further, if one or more similarity threshold(s) are present for a saved shape (121), the similarity threshold(s) specified for the individual saved shape (121) may override (take precedence over) the similarity threshold(s) provided for all saved shapes (121). Alternatively, in one or more embodiments, one or more similarity threshold(s) provided for the entire saved shape database (120) may override (take precedence over) the similarity threshold(s) provided specifically for any one saved shape (121), if present.

In one or more embodiments, a print image database (e.g., print image database (130)) is a data structure that includes one or more print image(s) (131). A print image database (130) may include (i) one or more print image(s) (131) for items (110) that are actively being printed on, (ii) one or more print image(s) (131) for items (not shown) not present on the conveyor (102), or (iii) any combination thereof.

In one or more embodiments, a print image (e.g., print image A (131A), print image N (131N)) is a data structure that may include (or otherwise be associated with):
(i) image data to be printed onto one or more item(s) (110) (e.g., any image file, TIFF, PNG, JPEG/JPG, or any vector file, etc.),
(ii) a unique print image identifier that allows for the unique identification of the single print image (e.g., a tag, an alphanumeric entry, a filename, a row number in table, etc.), or
(iii) any combination thereof.

Although the saved shape database (120) and the print image database (130) are shown as two distinct databases in FIG. 1A, both databases (120, 130) may be combined into a single database (not shown) that includes all of the data of both databases (120, 130) (e.g., the saved shape database (120) may include the print image database (130), and the print image database (130) may include the saved shape database (120)). Further, in any such combined database, certain data therein may be logically divided into a "saved shape database" (120) or a "print image database" (130). Therefore, reference to any one of these individual databases does not exclude the possibility that there exists a combined database that includes both the saved shape database (120) and the print image database (130). As a non-limiting example, the saved shape database (120) and the print image database (130) may exist as a single table, where a first column is the saved shape database (120) (storing saved shape(s) (121)) and a second column is the print image database (130) (storing print image(s) (131))—and a saved shape (121) and a print image (131) may be uniquely associated via a shared row in the table.

In one or more embodiments, a scanned shape database (e.g., scanned shape database (140)) is a data structure that includes one or more scanned shape(s) (141).

In one or more embodiments, a scanned shape (e.g., scanned shape A (141A), scanned shape N (141N)) is a data structure that includes properties (measured, recorded, and/or identified) about an item (110) analyzed by the camera (112). In one or more embodiments, a scanned shape (141) may include (or otherwise be associated with):
(i) data that provides the partial and/or complete two-dimensional contours of an item (110) (e.g., an image file, a vector file, and/or a CAD file),
(ii) the item lateral position,
(iii) the item longitudinal position,
(iv) one or more percent similar value(s) respectively associated with one or more saved shape identifier(s),
(v) a status of the "matching" process (e.g., "yet to be performed"/"TBD", "unknown", "defective", "match", etc.),
(vi) a saved shape identifier that matches the scanned shape (141) of the item (110),
(vii) a print image identifier associated with the identified saved shape (121),
(viii) the item rotation,
(ix) any other property relevant to a scanned shape (141), or
(x) any combination thereof.

In one or more embodiments, the data that provides the partial and/or complete two-dimensional contours of an item (110) in a scanned shape (141) may be generated from image data generated by a camera (112).

In one or more embodiments, a conveyor (e.g., conveyor (102)) is an electromechanical system that moves one or more item(s) (110) from a first location to a second location (and every location therebetween). A conveyor (102) may operate by moving a surface of the conveyor (102) on which one or more item(s) (110) rest—thereby moving the item(s) (110) via frictional contact. In one or more embodiments, the movement of the conveyor (102) (e.g., by a motor (not shown) mechanically coupled to the conveyor (102)) may be controlled by a computing device (114) (e.g., toggling the movement, controlling the speed of the motor). Non-limiting examples of a conveyor (102) include a belt conveyor and a roller conveyor. One of ordinary skill in the art (having the benefit of this detailed description) would appreciate what a conveyor (102) is and the varying forms a conveyor (102) may take. In one or more embodiments, a surface of the conveyor (102) (e.g., a conveyor belt) may be patterned and/or colored such that it visually contrasts with an item (110) and is therefore less computationally demanding for a computing device (114) to identify an item (110) on the surface (e.g., the conveyor (102) surface may be neon green, have a checkered surface, be highly reflective, etc.).

In one or more embodiments, a conveyor's surface may be configured to be stationary (with few or no moving parts) where a camera (112) and one or more printhead(s) (106) are configured to move over the conveyor's surface to identify, locate, and print on one or more item(s) (110). Movement of the camera (112) and/or printhead(s) (106) may be performed via one or more motor(s) (not shown) controlled by a computing device (114)).

In one or more embodiments, a conveyor direction (e.g., conveyor direction (104)) is the direction in which the surface (i.e., the top surface) of the conveyor (102) moves (e.g., the upward facing portion of a conveyor belt).

In one or more embodiments, a conveyor encoder (e.g., conveyor encoder (116)) is an electromechanical device that measures angular position of the shaft attached thereto and converts that angular position into electrical signals (i.e., a rotary encoder). In one or more embodiments, a conveyor encoder (116) (specifically, the shaft thereof) is mechanically coupled to a conveyor (102) such that the conveyor encoder (116) measures the position and speed of the conveyor's surface (and, indirectly, any item (110) sitting thereon). The electrical signals from a conveyor encoder (116) may be used (e.g., by a computing device (114)) to track the angular position and rotation speed of the shaft of the conveyor encoder (116), the conveyor (102), and/or any item (110) sitting on the conveyor.

In one or more embodiments, an item (e.g., item A (110A), item B (110B), item C (110C)) is any physical object. An item (110) may be placed on a conveyor (102) such that ink may be applied to a surface of the item (110) via printhead(s) (106).

In one or more embodiments, a camera (e.g., camera (112)) is a device that captures image data (i.e., one or more image(s)) of one or more item(s) (110) in the camera view (113). A camera (112) may be displaced vertically above the conveyor (102) to allow for item(s) (110) to pass underneath. The computing device (114) may control the camera (112) to capture image data and further use that image data to generate one or more scanned shape(s) (141) of the item(s) (110).

In one or more embodiments, a camera (112) is a "line scan" camera that generates image data in a single row of pixels (e.g., 1 pixel by 2048 pixels), where the row of pixels spans the lateral width of the camera view (113). Accordingly, in one or more embodiments, image data for an item (110) may be generated by combining one or more image(s) captured by the camera (112).

In one or more embodiments, a camera (112) is a two- or three-dimensional laser (or other optical) scanner that uses one or more lasers to identify item(s) (110). A laser scanner may use laser(s) to identify the shape of an item (110) via displacement of the laser's distance to the conveyor's surface. As a non-limiting example, an item (110) with a thickness of one inch (in the vertical direction) may pass beneath the laser scanner. The laser scanner may determine the shape (e.g., the outer contours) of the item (110) by identifying which areas in the camera view (113) are raised one inch above the conveyor's surface (i.e., the item (110)) and which areas are not raised (i.e., the conveyor's surface).

In one or more embodiments, a camera view (e.g., camera view (113)) is an area on and above the conveyor's (102) top surface in which a camera (112) is configured to capture image data. That is, a camera (112) is capable of generating image data of anything (e.g., item(s) (110)) disposed within the camera view (113). A camera view (113) may extend up-to-and-beyond the lateral width of the conveyor (102) thereby enabling the camera (112) to capture image data of any item (110) on the conveyor (102) (passing through the camera view (113)).

In one or more embodiments, a printhead (e.g., printhead(s) (106)) is an electromechanical device that ejects ink. A printhead (106) may be one of several printheads (106), each configured to eject only a single color of ink (e.g., one printhead (106) for each of cyan, magenta, yellow, black, and white). A printhead (106) may be mounted to a motorized track (not shown) displaced vertically above the conveyor (102) that allows the printhead (106) to move over the entire lateral width of the conveyor (102) and print within a print area (108). Further, a computing device (114) may control (i) the lateral position of a printhead (106) (i.e., via control of the motorized track) and (ii) the ejection of ink from the printhead (106). Accordingly, in one or more embodiments, a computing device (114) may cause one or more printhead(s) to apply one or more color(s) of ink to one or more item(s) (110) via control of the movement and ink ejection of the printhead(s) (106) (in addition to control of the conveyor (102)).

In one or more embodiments, a print area (e.g., print area (108)) is an area on and above the conveyor's (102) top surface in which one or more printhead(s) (106) are configured to eject ink. That is, one or more printhead(s) (106) are capable of ejecting ink onto anything (e.g., item(s) (110)) disposed within the print area (108). A print area (108) may extend up-to-and-beyond the lateral width of the conveyor (102) thereby enabling the printhead(s) (106) to print on any item (110) on the conveyor (102) (passing through the print area (108)).

While FIGS. 1A-1C show specific configurations of a printing system, other configurations may be used without departing from the disclosed embodiment. Accordingly, embodiments disclosed herein should not be limited to the configuration of devices and/or components shown in FIGS. 1A-1C.

FIG. 1D

Figure 1D:
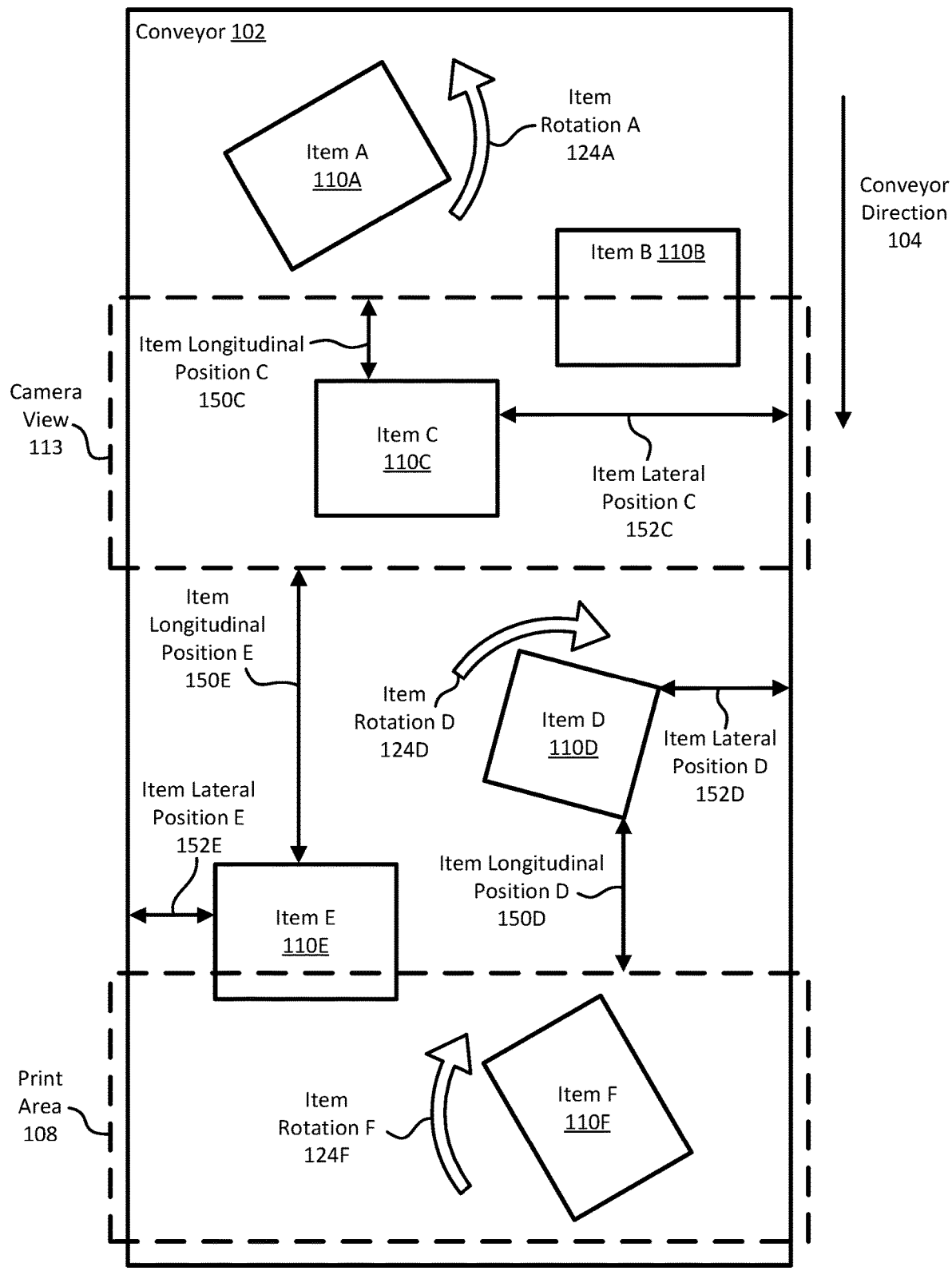
FIG. 1D shows a diagram of a conveyor, in accordance with one or more embodiments.

FIG. 1D shows a diagram of a conveyor, in accordance with one or more embodiments. Items (e.g., item A (110A), item B (110B), item C (110C), item D (110D), item E (110E), item F (110F)) may be placed on a conveyor (102) at various item lateral positions (152) and item rotations (124).

In one or more embodiments, an item lateral position (e.g., item lateral position (152)) is the distance (e.g., offset) of an item (110) with respect to a fixed point, edge, or surface (e.g., an edge/side of the conveyor (102)). As a non-limiting example, as shown for item C (110C), the item lateral position C (152C) may be measured from the "rightmost" edge of item C (110C) to a "right" side edge of the conveyor's surface at some point in the camera view (113) (parallel to the conveyor direction (104)). That is, the item lateral position C (152C) may be "10 inches", if there is a 10 inch gap between the rightmost part of item C (110C) and the conveyor's right side edge. Similarly, item lateral position D (152D) may be measured from a "rightmost" edge (or "rightmost" point, if rotated) of item D (110D) to a "right" side edge of the conveyor's surface. As another non-limiting example, an item lateral position (152) may be measured from the "leftmost" edge of an item (110) to a "left" side edge of the conveyor's surface (e.g., as shown for item lateral position E (152E) for item E (110E)).

In one or more embodiments, the fixed point, edge, or surface against which an item lateral position (152) is measured, may not be present throughout the longitudinal length of the conveyor (102). As a non-limiting example, a conveyor (102) may get narrower or wider past the camera view (113) (in the conveyor direction (104)). However, the measured item lateral position (152) may remain constant (e.g., 5 inches), even though the edge of the conveyor (102) is closer or further away (e.g., 3 inches, 7 inches). Such differences may be accounted for when calibrating the printhead(s) to print at the proper lateral offset (e.g., adding or subtracting distance to account for the variation).

Further, although not shown to avoid cluttering the figures, any point/edge/surface on an item (110) may be used to measure the item lateral position (152) (e.g., a centerline, a right edge of an item (110) to a left edge of the conveyor (102), etc.). One of ordinary skill in the art would appreciate that any fixed structure and point on an item (110) may be used to measure an item lateral position (152).

In one or more embodiments, an item longitudinal position (e.g., item longitudinal position (150)) is the distance (e.g., offset) of an item (110) to a fixed point, edge, or surface on the conveyor (102), measured in the conveyor direction (104). An item longitudinal position (150) may be initially measured at some point in time (e.g., when the item (110) is in the camera view (113)) and periodically calculated via the conveyor encoder as the conveyor (102) moves.

As a first non-limiting example, as shown for item C (110C), an item longitudinal position C (150C) may be measured from the "back" edge of item C (110C) to a "starting" edge of the camera view (113) (the side which an item (110) enters first). That is, once the rearmost edge of item C (110C) enters the camera view (113), item longitudinal position C (150C) may be measured by the computing device (e.g., measured as "0"). Further, as the conveyor encoder tracks the movement of the conveyor (102), the computing device may periodically update item longitudinal position C (150C) based on the measured movement of the conveyor's (102) surface (e.g., updated every millisecond, two seconds, etc.) via the conveyor encoder. Accordingly, item C's (110C) location along the conveyor direction (i.e., item longitudinal position C (150C)) may be calculated and/or extrapolated after the initial measurement via the conveyor encoder (even if not directly measured again).

As a second non-limiting example, as shown for item E (110E), an item longitudinal position E (150E) may be measured from the "back" edge of item E (110E) to an "exit" edge of the camera view (113) (the side which is most in the conveyor direction (104)). That is, once the rearmost edge of item E (110E) exits the camera view (113), item longitudinal position E (150E) may be measured (and updated) by the computing device. As a third non-limiting example, as shown for item D (110D), an item longitudinal position D (150D) may be measured from the "front" edge (or "front" point when rotated) of item D (110D) to a "starting" edge of the print area (108) (the side which an item (110) enters first). That is, once image data of the frontmost edge of item D (110D) is captured (e.g., via the camera), item longitudinal position D (150D) may be calculated (and updated) by the computing device.

Further, although not shown to avoid cluttering the figures, any point/edge/surface on an item (110) may be used to measure the item longitudinal position (150) (e.g., a centerline, a center point, a front edge of an item (110) to a starting edge of the camera view (113), etc.). One of ordinary skill in the art would appreciate that any fixed structure and point on an item (110) may be used to measure an item longitudinal position (150).

In one or more embodiments, an item rotation (e.g., item rotation (124)) is a difference in angle between a scanned shape and a matching saved shape. Specifically, the item rotation may be calculated by identifying an angle (e.g., in degrees, radians, etc.) at which the saved shape must be rotated to align with the scanned shape (e.g., aligning the contours of the saved shape and the scanned shape). In one or more embodiments, the computing device utilizes software (employing one or more different methods) to measure the angle difference between the scanned shape and the saved shape.

As a first non-limiting example, item A (110A) sits at item rotation A (124A) that is the difference in angle between the saved shape that matches the scanned shape of item A (110A). Similarly, as a second non-limiting example, item D (110D) sits at item rotation D (124D) that is the difference in angle between the saved shape that matches the scanned shape of item D (110D). And, as a third non-limiting example, item F (110F) sits at item rotation F (124F) that is the difference in angle between the saved shape that matches the scanned shape of item F (110F).

FIG. 2

Figure 2:
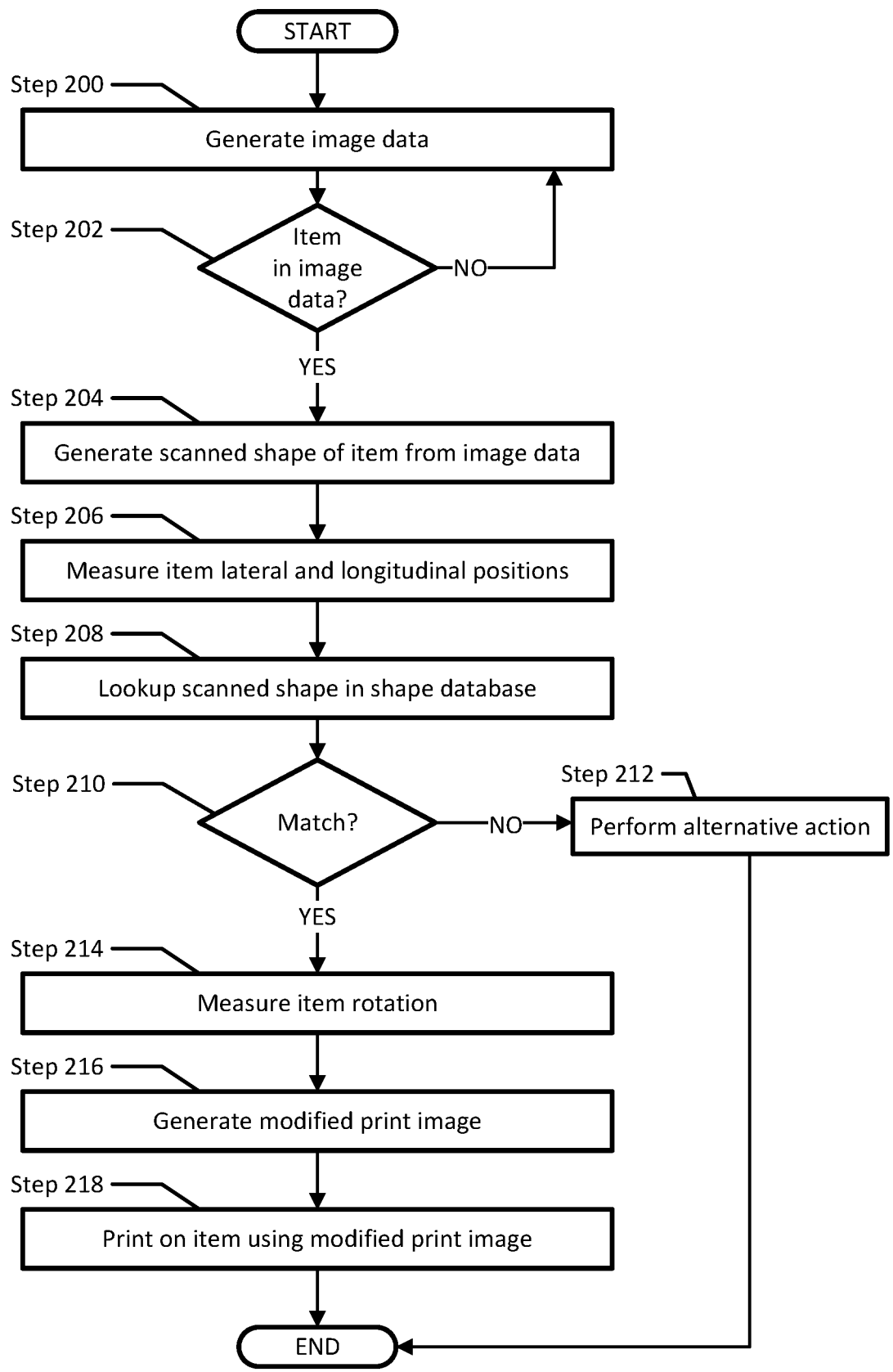
FIG. 2 shows a flowchart of a method for identifying an item's placement and rotation, in accordance with one or more embodiments.

FIG. 2 shows a flowchart of a method for identifying an item's position and rotation, in accordance with one or more embodiments. All or a portion of the method shown may be performed by one or more components of the printing system (e.g., the computing device). However, another component of the printing system may perform this method without departing from the embodiments disclosed herein. While the various steps in this flowchart are presented and described sequentially, one of ordinary skill in the relevant art (having the benefit of this detailed description) would appreciate that some or all of the steps may be executed in different orders, combined, or omitted, and some or all steps may be executed in parallel.

In Step 200, the computing device generates image data via a camera. In one or more embodiments, the computing device controls (or otherwise causes) the camera to capture image data of whatever is in the camera view (e.g., an empty conveyor, portion(s) of one or more item(s) sitting on the conveyor, etc.). Further, the computing device is causing the conveyor to move in a conveyor direction, thereby causing any items on the conveyor to move in the conveyor direction as well.

In one or more embodiments, the camera generates images at calculated intervals (e.g., triggered by the conveyor encoder), such that the discrete images may be digitally stitched together to form images larger than the camera view (and produce image data for one or more item(s)). The rate at which images are generated may depend, for example, on the speed of the conveyor (and may be automatically triggered by the conveyor encoder via the computing device). Further, by stitching multiple images together, the computing device may use the camera to produce a "continuous" scan of the conveyor surface (and image data of any items thereon), as the conveyor's surface moves through the camera view. Accordingly, the computing device (via the camera) is able to capture image data of an item that is longer than the camera view (i.e., the entire item does fit within the camera view and cannot be depicted within a single image, but may be entirely captured by multiple images stitched together).

In Step 202, the computing device makes a determination if an item is in the image data. In one or more embodiments, the computing device may determine if an item is in the image data by performing one or more image processing tasks on the image data. In one or more embodiments, an item may be identifiable in the image data via visually contrasting differences between the item and the conveyor (e.g., due to lighting, contrasting colors, contrasting patterns, etc.). In one or more embodiments, an item may be identifiable in the image data via the detection of a reduction in distance from the camera to the conveyor's surface (e.g., via a laser scanner).

If the computing device determines that an item is not in the image data (Step 202—NO), the method returns to Step 200. However, if the computing device determines that an item is in the image data (Step 202—YES), the method proceeds to Step 204.

In Step 204, the computing device generates a scanned shape of the item from the image data of that item. In one or more embodiments, generating a scanned shape of the item includes processing the image data of the item to isolate the outer contours (and any internal openings) of the item from other data that may be present in the image data (e.g., image data of the item's surface, image data of the conveyor behind the item). In one or more embodiments, processing visual image data may include generating an outline of the item, then discarding the image data of the item's surface and/or the conveyor. Further, discarding the image data may include replacing the visual image data with contrasting colors (e.g., making the item solid black and the conveyor background solid white—or transparent).

As a non-limiting example, an item may be constructed from steel that includes uneven coloration and manufacturing markings. Further, the conveyor, on which the steel item rests, may include stains. In turn, the camera captures the entirety of the item and the exposed portions of the conveyor—including the coloration and markings on the item's surface and a stained portion of the conveyor. However, once the computing device identifies the outer contours of the item, the image data within the item's contours (the steel coloration and the markings) may be discarded (e.g., replaced with all black) while the background conveyor image data may be discarded (e.g., replaced all white, made transparent).

In one or more embodiments, where an item is longer than the camera view and requires multiple images to be stitched together, the computing device may wait for the entirety of the item to pass into the camera view (in order to obtain images of the entire item) before generating a scanned shape of the item.

In Step 206, the computing device measures the item lateral position and the item longitudinal position. In one or more embodiments, the computing device measures the item lateral position and the item longitudinal position via the image data, where the edges of the item are measured against one or more fixed structure(s) (e.g., any fixed point, edge, surface, etc.). The computing device may calculate an updated item longitudinal position based on the movement of the conveyor (as measured by the conveyor encoder) at any point during this method (e.g., at time intervals (fixed or dynamic) and/or based on any other criteria).

In Step 208, the computing device performs a lookup, in the saved shape database, to identify a saved shape matching the scanned shape. In one or more embodiments, the computing device executes one or more image comparison processes to compare the scanned shape (generated in Step 202) against one or more saved shape(s) in the saved shape database. As a non-limiting example, an image comparison process may include comparing the scanned shape against each saved shape (in the saved shape database) and output a percent similar value for each saved shape (e.g., 10% similar, 57% similar, 99% similar, etc.).

In Step 210, the computing device makes a determination if there is a match between the scanned shape and a saved shape in the saved shape database. In one or more embodiments, the computing device may make the determination based on whether a first similarity threshold is surpassed (i.e., exceeded) by a percent similar value. A first similarity threshold (e.g., 97%) may be set (e.g., by a user, by default), where if a scanned shape and any saved shape are found to have a percent similar value at or above the first similarity threshold, that saved shape is identified as a "match" for the scanned shape.

If the computing device identifies a saved shape that matches the scanned shape at or above a first similarity threshold (Step 210—YES), the method proceeds to Step 214. However, if the computing device does not identify any saved shape at or above a first similarity threshold (Step 210—NO), the method proceeds to Step 212.

In one or more embodiments, there may be a second similarity threshold that is used to identify whether an item is defective or unknown. In one or more embodiments, if a percent similar value for a scanned shape matches a saved shape above a second similarity threshold, but below a first similarity threshold, the item (from which the scanned shape was generated) may be considered a "defective" variant of the item (for which the saved shape was generated). Further, if a percent similar value for a scanned shape is below a first similarity threshold and below second similarity threshold (for all saved shapes), the item (from which the scanned shape was generated) may be considered an "unknown" (having no discernable matching saved shape)). As a non-limiting example, a second similarity threshold (e.g., 90%) may be set (e.g., by a user, by default), such that if a scanned shape's percent similar value is below the first similarity threshold (e.g., less than 97% similar), but above (i.e., surpassing, exceeding) the second similarity threshold (above 90% similar), the item is identified as "defective" (e.g., a defective variant of a known item, a saw blade missing a saw tooth, etc.). Whereas, if a scanned shape's percent similar value is below the first similarity threshold (e.g., less than 97%) and also below the second similarity threshold (e.g., less than 90%), the item is identified as "unknown". In one or more embodiments, the computing device may add the status of the matching shape (e.g., "match", "defective", or "unknown") to the scanned shape database for the corresponding scanned shape.

Although a description of a "second similarity threshold" is provided herein, a "second similarity threshold" is entirely optional and not necessary to the performance of the overall method. The description of the "second similarity threshold" is provided only as an optional embodiment.

In Step 212, the computing device performs an alternative action for the scanned shape. In one or more embodiments, an alternative action performed in response to making the determination that the scanned shape was not similar enough to any saved shape (i.e., lacking a percent similar value above a first similarity threshold), may include:
  (i) logging the percent similar value (e.g., write the percent similar value to the scanned shape database for that scanned shape),
  (ii) generating an alert (e.g., sound an alarm via a speaker, flash a light, send an email to a specific email address, send an output to a monitor, etc.) which may include a timestamp and human-readable text/speech (e.g., "attention: defective item identified", "unknown item", etc.), and/or
  (iii) doing nothing (e.g., do not print on the item, do not perform any specific actions in response to determining the scanned shape is below the first similarity threshold).

In Step 214, the computing device measures the item rotation. In one or more embodiments, the item rotation is calculated from a comparison between the scanned shape and the identified saved shape.

In Step 216, the computing device generates a transformed print image. In one or more embodiments, a transformed print image is a copy of a print image that has been (i) positioned, (ii) rotated, or (iii) positioned and rotated. In one or more embodiments, the computing device generates a transformed print image by performing a lookup in the print image database to identify the print image associated with the identified saved shape, then rotating that print image by the item rotation (computed in Step 214). Further, the transformed print image may be generated by modifying the print image to laterally shift the print image to the item lateral position (e.g., creating a transformed print image that is the width of the print area, where the original print image is rotated and laterally placed in the transformed print image).

In Step 218, the computing device controls the printhead(s) to print the transformed print image onto the item. In one or more embodiments, the computing device begins a printing process when it is determined that the item longitudinal position is within the print area (e.g., initially measured with the camera at Step 206 and updated using the conveyor encoder). The computing device may control a motorized rack (to which the printhead(s) are attached) to move the printhead(s) to the item lateral position. Further, the computing device may control the motorized rack and printhead(s) to eject ink onto the body of the item (with the desired colors at the desired locations).

In one or more embodiments, multiple items may be printed on simultaneously, where the computing device (via the printhead(s)) may print multiple transformed print images simultaneously across the items (e.g., a printhead may print portions of two or more transformed print images (on two or more respective items) in a single sweep of a printhead across the lateral width of the print area).

In one or more embodiments, after ink is applied to an item, the conveyor may continue to move the item for additional processing. As a non-limiting example, the ink may be "cured" via one or more curing device(s) (e.g., one or more ultraviolet (UV) light(s), one or more heater(s), one or more fan(s), etc.).

In one or more embodiments, the computing device may control the speed of the conveyor (e.g., making it faster, slower, causing it to stop), to ensure that each step of the process (Step 200 through Step 218) may be completed, as needed, for subsequent steps to be performed properly. As a non-limiting example, if there are a large number of items on the conveyor and the computing device is taking more time than expected to identify matching saved shapes, the computing device may slow down the conveyor such that each scanned shape is properly analyzed before allowing those items to enter the print area. As another non-limiting example, if the printhead(s) are printing across two items simultaneously disposed at opposite distal lateral ends of the print area, the computing device may slow down the conveyor to allow the printhead(s) to complete the printing operations fully on the items. One of ordinary skill in the art, having the benefit of this detailed description, would appreciate that the computing device may control the conveyor speed to allow the slowest operation to complete such that subsequent dependent operations of the method execute properly.

Although the method and process of FIG. 2 is explained for a single instance, the method may be performed multiple times concurrently and sequentially by the computing device. That is, as a non-limiting example, the computing device may be generating a scanned shape for a first item and a second item, performing a lookup in the saved shape database for a third item, and printing on a fourth, fifth, and sixth item—all concurrently.

FIGS. 3A-3B

Figure 3A:
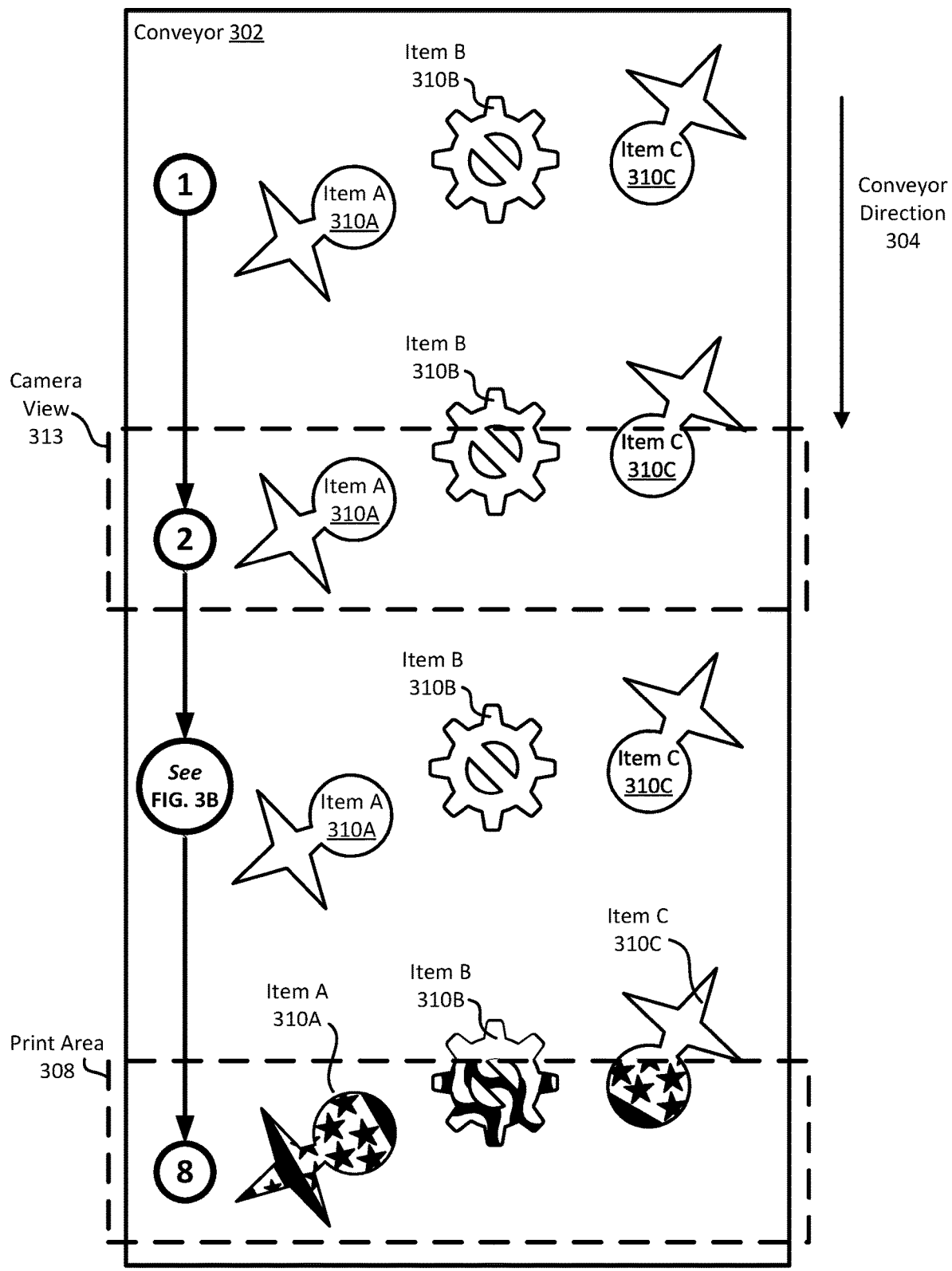
FIG. 3A shows an example, in accordance with one or more embodiments.
Figure 3B:
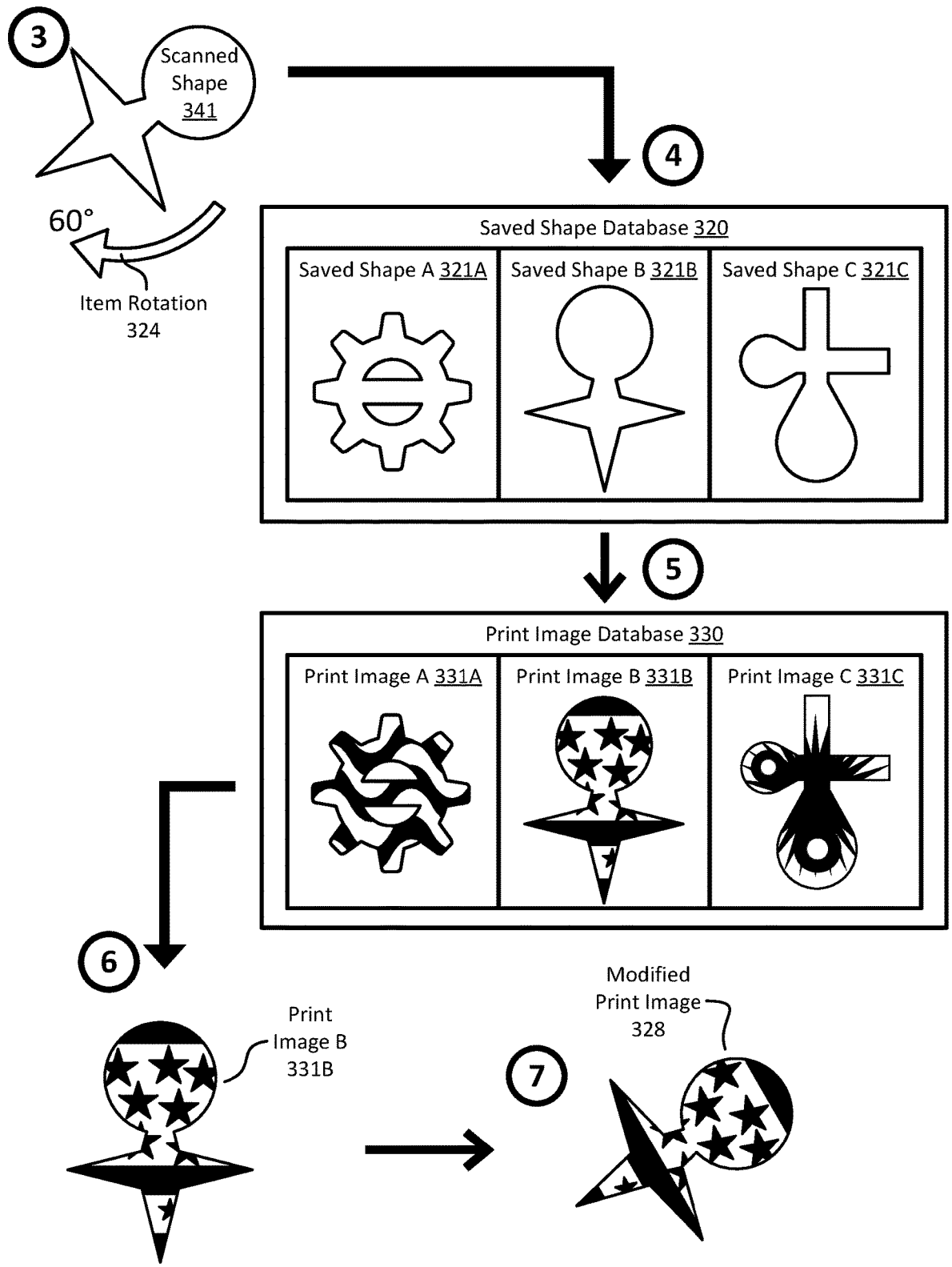
FIG. 3B shows an example, in accordance with one or more embodiments.

FIGS. 3A-3B show an example, in accordance with one or more embodiments.

At (1), consider a scenario where three items—item A (310A), item B (310B), and item C (310C)—are placed on a conveyor (302) at various item lateral positions and item rotations. Item A (310A) and item C (310C) are the same type of item, whereas item B (310B) is a different type of item. The three items (310) are placed at an end of the conveyor (302) outside of the camera view (313) and the print area (308). The three items (310) move into the camera view (313) and then the print area (308) via the movement of the conveyor (302) in the conveyor direction (304). Further, a computing device (not shown) causes the conveyor (302) to move in the conveyor direction (304) via control of one or more motors (not shown) on the conveyor (302).

At (2), item A (310A) has moved into the camera view (313), but item B (310B) and item C (310C) are only partially inside the camera view (313) with portions that have yet to enter the camera view (313). The computing device (not shown) uses the camera (not shown) to capture image data of the items (310) in the camera view (313). As the entirety of item A (310A) has entered the camera view (313), the computing device uses the image data (captured by the camera) to generate a scanned shape (341).

At (3) and (4), while or after item A (310A) is in the camera view (313), the computing device (not shown) identifies the saved shape (321) (in the saved shape database (320)) that most closely matches the scanned shape (341). To accomplish this, the computing device generates a percent similar value between the scanned shape (341) and each saved shape (321) in the saved shape database (320). For the scanned shape (341), saved shape A (321A) is found to have a percent similar value of 35%, saved shape B (321B) is found to have a percent similar value of 98%, and saved shape C (321C) is found to have a percent similar value of 67%. As the first similarity threshold is set to 95% for all saved shapes (321), the computing device identifies saved shape B (321B) as the saved shape (321) that most closely matches the scanned shape (341) (when rotated by the item rotation (324)—60° clockwise).

At (5), the computing device performs a lookup in the print image database (330) to identify the print image (331) associated with the identified saved shape (321). As shown in the example of FIGS. 3A-3B, the print image database (330) includes print image A (331A) (associated with saved shape A (321A)), print image B (331B) (associated with saved shape B (321B)), and print image C (331C) (associated with saved shape C (321C)).

At (6) and (7), the computing device identifies print image B (331B) as being associated with saved shape B (321B) (the previously identified saved shape (321)). The computing device then loads (e.g., copies to memory) and rotates print image B (331B) by the item rotation (324) (60° clockwise) to obtain the transformed print image (328). The computing device then sends the transformed print image (328) to the printheads (not shown).

At (8), the item longitudinal position, the item lateral position, and the item rotation (324) of item A (310A) are known to the computing device (measured by the camera). Further, the item longitudinal position of item A (310A) (along the conveyor direction (304)) is updated via the conveyor encoder (not shown) tracking the conveyor (302) movements. Accordingly, the printheads (not shown) may be precisely controlled (by the computing device) to accurately print the transformed print image (328) onto item A (310A) as item A (310A) passes through the print area (308) (by the conveyor (302) moving in the conveyor direction (304)). Similarly, item B (310B) and item C (310C) are printed on with their respective transformed print images (not shown) by the printhead(s).

FIG. 4

Figure 4:
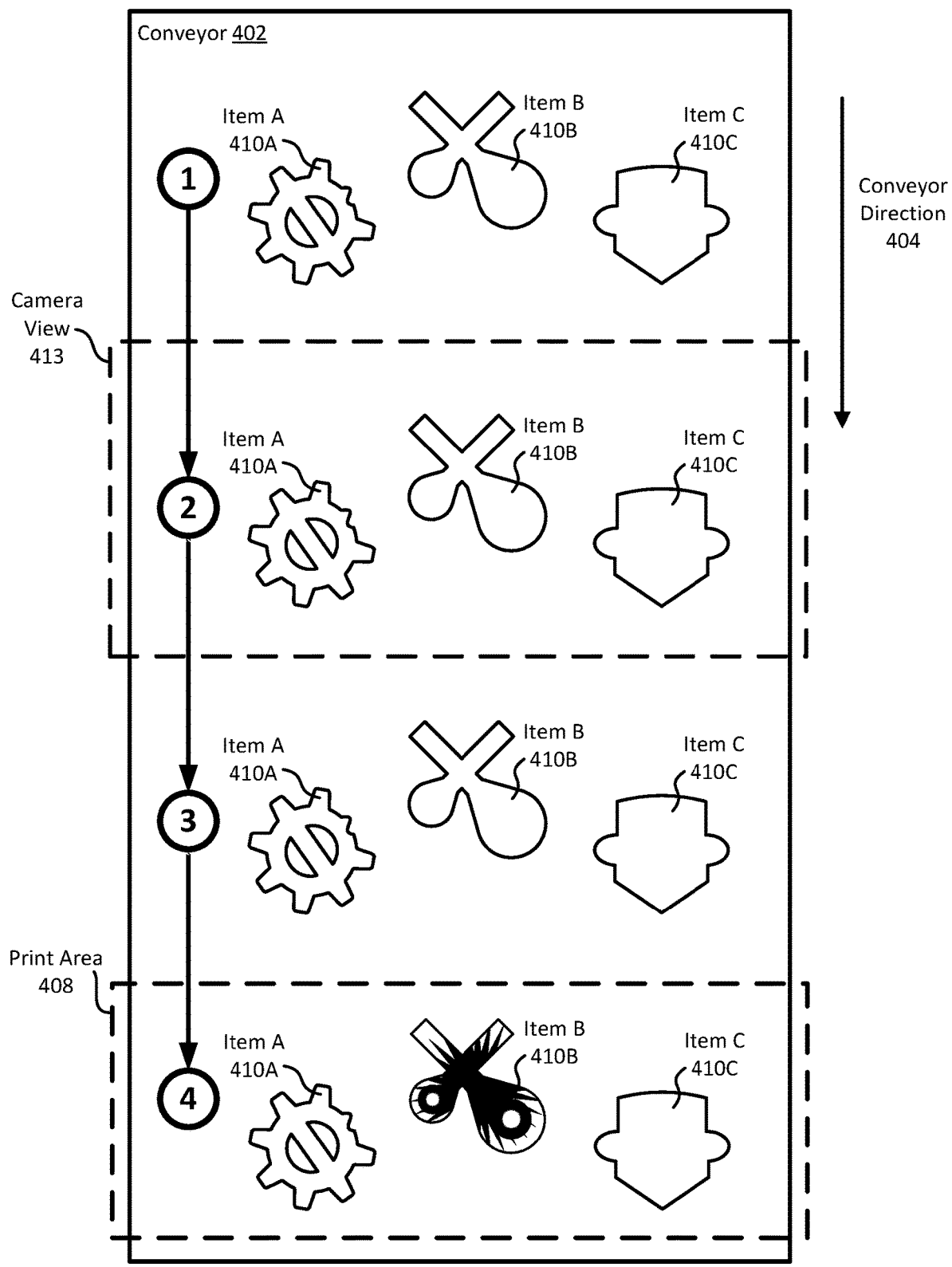
FIG. 4 shows an example, in accordance with one or more embodiments.

FIG. 4 shows an example, in accordance with one or more embodiments.

At (1), consider a scenario where three items—item A (410A), item B (410B), and item C (410C)—are placed on a conveyor (402) at various item lateral positions and item rotations. Item A (410A) is defective as it is missing a notch on the top-right (e.g., caused by improper manufacturing, damage, etc.). Item B (410B) is properly manufactured and to be printed on. And, item C (410C) is an unknown object placed on the conveyor (402).

The items (410) are placed at an end of the conveyor (402) outside of the camera view (413) and the print area (408). The three items (410) move into the camera view (413) and then the print area (408) via the movement of the conveyor (402) in the conveyor direction (404). Further, a computing device (not shown) causes the conveyor (402) to move in the conveyor direction (404) via control of one or more motors (not shown) on the conveyor (402).

At (2), the three items (410) move into the camera view (413). The computing device causes the camera to capture images (i.e., image data) of the three items (410). Further, the computing device generates three separate scanned shapes (not shown), one for each item (410).

At (2) or (3), the computing device performs three lookups in the saved shape database to identify each scanned shape. For item A (410A), the highest percent similar value (for any saved shape in the saved shape database) is 93%. For the identified saved shape, there is a separately specified first similarity threshold of 98% and second similarity threshold of 90%.

Because the percent similar value (93%) for item A (410A) is below the first similarity threshold (98%), the computing device does not match item A (410A) to the identified saved shape. However, because the percent similar value (93%) for item A (410A) is above the second similarity threshold (90%), the computing device identifies item A (410A) as a "defective" item of the identified saved shape. Further, in response to the determination that item A (410A) is "defective", the computing device sends a text alert to a monitor (not shown) attached to the computing device reading "defective item identified on conveyor at 16:32".

For item B (410B), the highest percent similar value (for any saved shape in the saved shape database) is 99%. For the identified saved shape, there is a separately specified first similarity threshold of 97%; and because the percent similar value (99%) for item B (410B) is above 97%, item B (410B) is matched to the identified saved shape. Accordingly, the computing device identifies the print image associated with the identified saved shape and generates a transformed print image (to match the item rotation and item lateral position of item B (410B)).

For item C (410C), the highest percent similar value (for any saved shape in the saved shape database) is 43%. For the identified saved shape, there is a separately specified first similarity threshold of 95% and second similarity threshold of 89%.

Because the percent similar value (43%) for item C (410C) is below the first similarity threshold (95%), the computing device does not match item C (410C) to the identified saved shape. Further, because the percent similar value (93%) for item C (410C) is below the second similarity threshold (89%), the computing device identifies item C (410C) as "unknown". In response to this identification, the computing device takes no additional actions with respect to item C (410C).

At (4), the computing device sends the transformed print image—generated for item B (410B)—to the printheads. As item B (410B) enters the print area (408), the computing device controls the printheads to apply ink to item B (410B), as specified by the transformed print image. The computing device does not cause the printheads to print on item A (410A) or item C (410C).

FIG. 5

Figure 5:
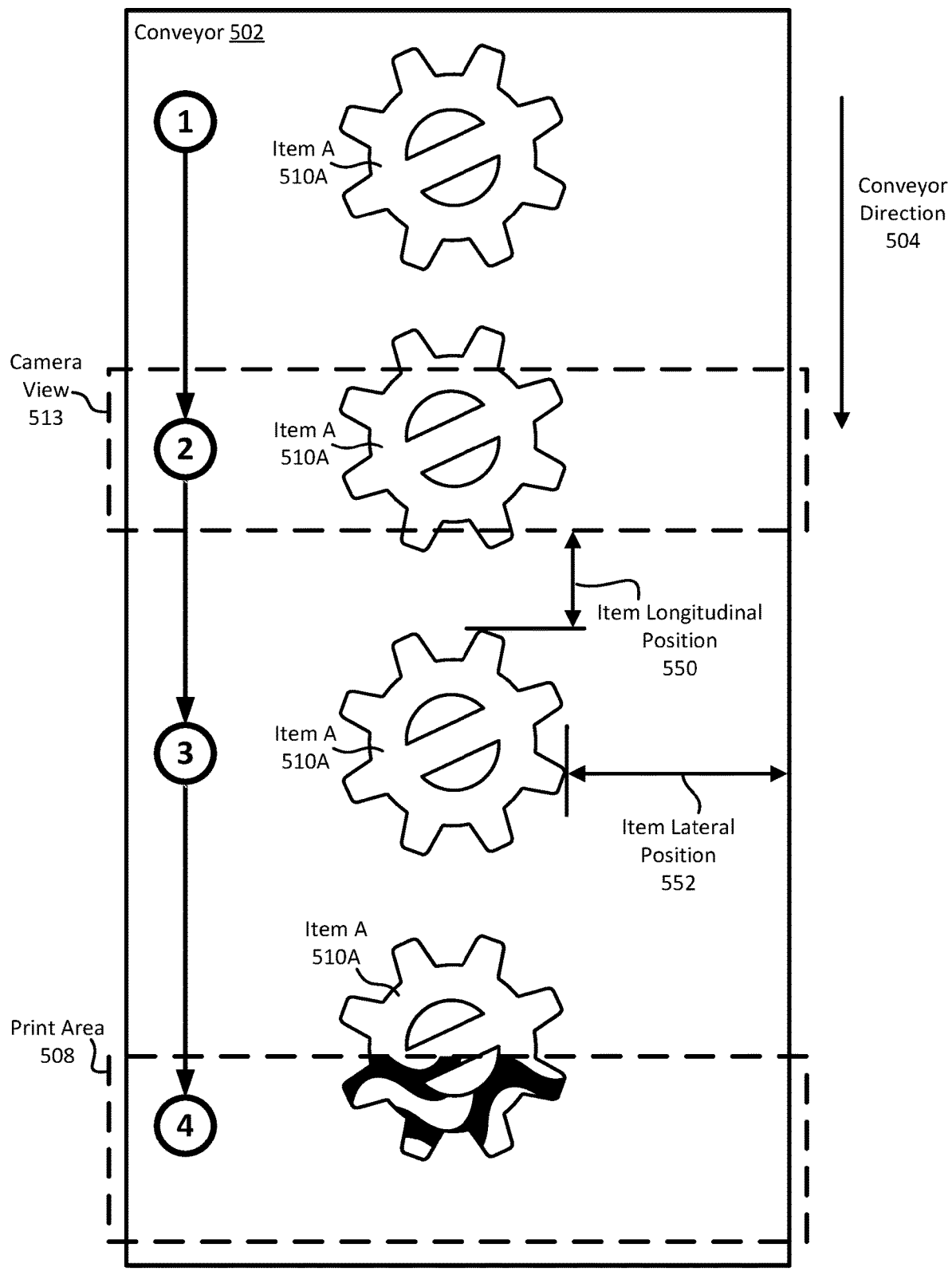
FIG. 5 shows an example, in accordance with one or more embodiments.

FIG. 5 shows an example, in accordance with one or more embodiments.

At (1), consider a scenario where item A (510A) is placed on a conveyor (502) at any item lateral position and item rotation. Item A (510A) is placed at an end of the conveyor (502) outside of the camera view (513) and the print area (508). Item A (510A) moves into the camera view (513) and then the print area (508) via the movement of the conveyor (502) in the conveyor direction (504). Further, a computing device (not shown) causes the conveyor (502) to move in the conveyor direction (504) via control of one or more motors (not shown) on the conveyor (502).

At (2), item A (510A) is too long to fit entirely within the camera view (513) at a single time (in the longitudinal direction). Accordingly, as item A (510A) begins to enter the camera view (513) (shortly prior to (2)), the camera (not shown) begins generating image data of item A (510A) and continues to generate image data of item A (510A) until, at least, the remaining portions of item A (510A) pass into the camera view (513) (shortly after (2)). Then, the multiple image data of item A (510A) are combined. That is, the computing device is configured to "stitch" together image data—taken at different times—to generate combined image data of an entire item.

Then, from the combined image data, the computing device generates the scanned shape of item A (510A) and measures (i) the item rotation, (ii) the item lateral position (552) and, (iii) the item longitudinal position (550). Specifically, as shown in FIG. 5, the item lateral position (552) is measured from the right edge of item A (510A) to the right edge of the conveyor (502). The item longitudinal position (550) is measured from the "rear" side of item A (510A) to the "end" of the camera view (513) (the side disposed most in the conveyor direction (504)). Further, the computing device updates (e.g., tracks) the item longitudinal position (550) as the conveyor (502) moves, as measured by a conveyor encoder (not shown).

At (3), the computing device performs a lookup, in a saved shape database, to identify a saved shape that most closely matches the scanned shape of item A (510A). Here, the computing device identifies a saved shape with a percent similar value of 97% to the scanned shape, where the first similarity threshold (for all saved shapes in the shape database) is 93%. Consequently, the computing device identifies the print image associated with the identified saved shape and rotates the print image by the item rotation to generate the transformed print image.

At (4), the computing device sends the transformed print image—generated for item A (510A)—to the printheads. As item A (510A) enters the print area (508), the computing device controls the printheads to apply ink to item A (510A), as specified by the transformed print image.

What is claimed is:

1. A method for printing on an item, comprising:
   generating a scanned shape of the item;
   performing a lookup of the scanned shape in a shape database;
   making a determination that the scanned shape matches a saved shape in the shape database, wherein making the determination comprises:
      comparing the scanned shape to a plurality of saved shapes in the shape database, wherein the plurality of saved shapes comprises the saved shape; and
      identifying a percent similar value that exceeds a first similarity threshold, wherein the percent similar value is measured between the scanned shape and the saved shape; and
   based on the determination:
      generating a transformed print image; and
      causing a printhead to print on the item using the transformed print image.

2. The method of claim 1, wherein comparing the scanned shape to a plurality of saved shapes, comprises:
   calculating a plurality of percent similar values between the scanned shape and each of the plurality of saved shapes, respectively, wherein the plurality of percent similar values comprises the percent similar value.

3. The method of claim 1, wherein prior to generating the transformed print image, the method further comprises:
   measuring an item rotation of the item.

4. The method of claim 3, wherein generating the transformed print image is based on the item rotation.

5. The method of claim 1, wherein prior to generating the transformed print image, the method further comprises:
   measuring an item lateral position of the item.

6. The method of claim 5, wherein generating the transformed print image is based on the item lateral position.

7. The method of claim 5, wherein causing the printhead to print on the item, comprises:
   moving the printhead based on the item lateral position.

8. The method of claim 1, wherein prior to generating the scanned shape of the item, the method further comprises:
   generating image data of the item, wherein the scanned shape is generated from the image data.

9. The method of claim 8, wherein a camera is used to generate the image data.

10. The method of claim 9, wherein the camera is a laser scanner or a line scan camera.

11. The method of claim 1, wherein after causing the printhead to print on the item using the transformed print image, the method further comprises:
    generating a second scanned shape of a second item;
    performing a second lookup of the second scanned shape in the shape database;
    making a second determination that the second scanned shape does not match any saved shape in the shape database; and
    based on the second determination:
       not causing the printhead to print on the second item.

12. The method of claim 11, wherein making the second determination, comprises:
    calculating a plurality of percent similar values between the second scanned shape and each of a plurality of saved shapes in the shape database, respectively,
    wherein each percent similar value of the plurality of percent similar values is below the first similarity threshold.

13. The method of claim 1, wherein after causing the printhead to print on the item using the transformed print image, the method further comprises:
    generating a second scanned shape of a second item;
    performing a second lookup of the second scanned shape in the shape database;
    making a second determination that the second item is defective based on the second lookup; and
    based on the second determination:
       not causing the printhead to print on the second item.

14. The method of claim 13, wherein making the second determination, comprises:
    calculating a plurality of percent similar values between the second scanned shape and each of a plurality of saved shapes in the shape database, respectively,
    wherein each percent similar value of the plurality of percent similar values is below the first similarity threshold.

15. The method of claim 14,
    wherein a second percent similar value, of the plurality of percent similar values, is above a second similarity threshold,
    wherein the second percent similar value is between the second scanned shape and the saved shape.

16. The method of claim 15, wherein the second item is a defective variant of the item.

17. The method of claim 16, wherein based on the second determination, the method further comprises:
    generating an alert.

18. The method of claim 17 wherein the alert comprises:
    sounding an alarm via a speaker;
    flashing a light;
    sending an email to an email address; or
    sending an output to a monitor.

19. A computing device comprising:
a processor, wherein the processor is configured to perform a method for printing on an item, wherein the method comprises:
  generating a scanned shape of the item;
  performing a lookup of the scanned shape in a shape database;
making a determination that the scanned shape matches a saved shape in the shape database, wherein making the determination comprises:
  comparing the scanned shape to a plurality of saved shapes in the shape database, wherein the plurality of saved shapes comprises the saved shape; and
  identifying a percent similar value that exceeds a first similarity threshold, wherein the percent similar value is measured between the scanned shape and the saved shape; and
  based on the determination:
    generating a transformed print image; and
    causing a printhead to print on the item using the transformed print image.

20. A non-transitory computer readable medium comprising instructions which, when executed by a processor, enables the processor to perform a method for printing on an item, comprising:
  generating a scanned shape of the item;
  performing a lookup of the scanned shape in a shape database;
  making a determination that the scanned shape matches a saved shape in the shape database, wherein making the determination comprises:
    comparing the scanned shape to a plurality of saved shapes in the shape database, wherein the plurality of saved shapes comprises the saved shape; and
    identifying a percent similar value that exceeds a first similarity threshold, wherein the percent similar value is measured between the scanned shape and the saved shape; and
  based on the determination:
    generating a transformed print image; and
    causing a printhead to print on the item using the transformed print image.

* * * * *